United States Patent
Hsieh et al.

[11] Patent Number: 5,949,510
[45] Date of Patent: Sep. 7, 1999

[54] METHOD FOR MAKING WIDE VIEWING ANGLE LCD AND DEVICES MADE

[75] Inventors: Ting-Chiang Hsieh; Chung-Kuang Wei; Huei-Ling Liao, all of Hsinchu, Taiwan

[73] Assignee: Industrial Technology Research Institute, Hsinchu, Taiwan

[21] Appl. No.: 08/928,825

[22] Filed: Sep. 12, 1997

[51] Int. Cl.[6] .................... G02F 1/1333; G02F 1/1337
[52] U.S. Cl. ................ 349/125; 349/122; 349/138
[58] Field of Search ............... 349/84, 122, 125, 349/113, 138, 139, 116

[56] References Cited

U.S. PATENT DOCUMENTS

| | | | |
|---|---|---|---|
| 4,519,678 | 5/1985 | Komatsubara et al. | 349/160 |
| 5,132,816 | 7/1992 | Itoh et al. | 349/113 |
| 5,204,765 | 4/1993 | Mitsui et al. | 349/122 |
| 5,552,909 | 9/1996 | Onisawa et al. | 349/139 |
| 5,691,791 | 11/1997 | Nakamura et al. | 349/113 |

*Primary Examiner*—William L. Sikes
*Assistant Examiner*—Dung Nguyen
*Attorney, Agent, or Firm*—Tung & Associates

[57] ABSTRACT

The present invention discloses a method for fabricating a liquid crystal display (LCD) cell that has improved wide-viewing-angle and devices so made by incorporating the processing steps of first forming a multiplicity of elongated steps on a substrate surface from a negative photoresist layer, then covering the elongated steps with an insulating material such that sloped sidewalls are produced on the multiplicity of elongated steps. After the liquid crystal material is filled into a cavity formed between the substrate and an upper substrate, the liquid crystal molecules are aligned to the same angle as the sloped sidewalls on the multiplicity of the elongated steps such that the viewing angle of the liquid crystal display cell can be improved.

20 Claims, 2 Drawing Sheets

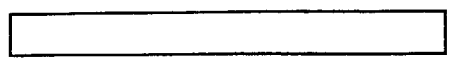
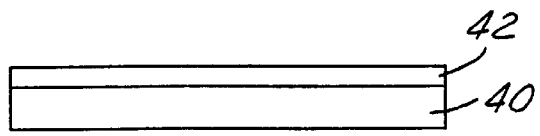
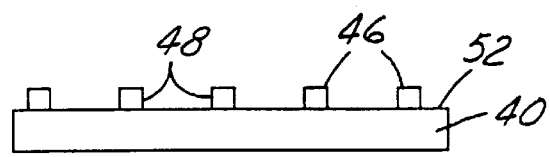
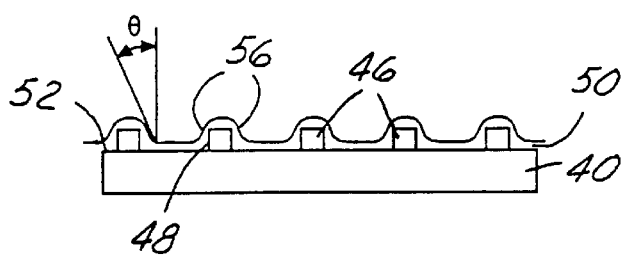
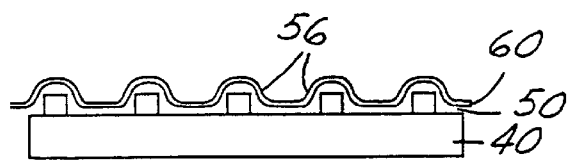
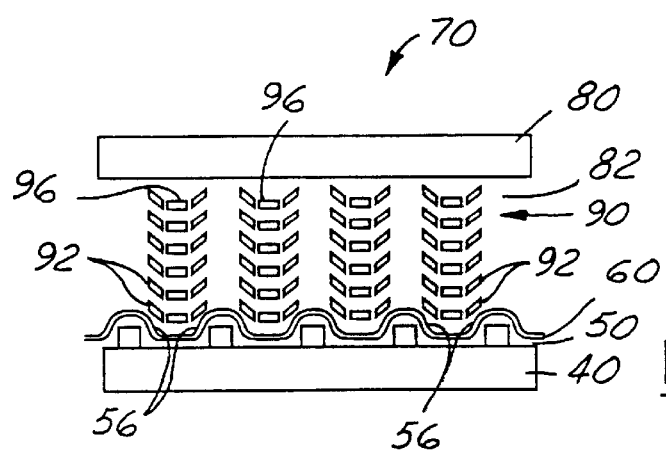

METHOD FOR MAKING WIDE VIEWING ANGLE LCD AND DEVICES MADE

FIELD OF THE INVENTION

The present invention generally relates to a method for fabricating a liquid crystal display (LCD) cell and more particularly, relates to a method for fabricating a LCD cell by first forming elongated steps on a glass substrate, then coating the steps with a layer of an insulating material such that sloped sidewalls on the steps are formed to subsequently align liquid crystal molecules in the same slope and thus improving the viewing angle of the LCD.

BACKGROUND OF THE INVENTION

Liquid crystal display devices have been used for many years and their uses have been concentrated in small appliance applications such as in electronic watches and calculators. LCD's have also been used in applications for instrumental numerical displays and graphical displays. More recently, the development of color LCD's and large screen LCD's have broadened their applications to televisions and notebook computers.

Major benefits for LCD's are their inherent properties of small thickness, lightweight, low driving voltage required and low power consumption. As a consequence, more recent applications of color LCD's can be found in small screen television sets, notebook computer display panels and video camera view finders as replacements for conventional CRT's. A liquid crystal display device can be either a color unit or a black and white unit. The device can also be constructed as a reflecting type or as a transmittive type, depending on the light source used.

Since liquid crystal molecules respond to an externally applied electrical voltage, liquid crystals can be used as an optical switch or as a light valve. A typical liquid crystal display cell arrangement is shown in FIGS. 1A and 1B.

Referring initially to FIG. 1A, wherein a liquid crystal display device 10 is shown. Liquid crystal display cell 10 is a single pixel which is constructed by two parallel glass plates, i.e., an upper plate 12 and a lower plate 14. Both the upper plate 12 and the lower plate 14 have a polarizing film 36 and 32 coated on its outer surface. The cavity 18 formed between the two plates 12 and 14 is filled with a liquid crystal material 20. One of the most commonly used liquid crystal material is of the twisted nematic (TN) type wherein the twist refers to the tendency of the polymer liquid crystal to form chains that rotate from one side 22 of the gap between the plates to the other side 24 of the gap. The degree of rotation can be controlled during the fabrication process.

As shown in FIG. 1A, light beam 28 passes through the polarizer 36 and then through the liquid crystal display cell 10 having its polarization direction rotated by following the physical rotation of the liquid crystal molecules 26. As shown in the simplified illustration in FIG. 1A, the polarizer 32 on the exit side 24 of the liquid crystal cell 10 is positioned such that it allows a rotated light beam 30 to pass through the polarizer 32. When viewed from the side of the polarizer 32, the pixel or the liquid crystal cell 10 thus appears clear, i.e., in a transmitting mode.

A transparent electrical conductor (not shown) such as indium-tin-oxide (ITO) is normally deposited on the inner surfaces of the glass plates 12 and 14. The transparent electrical conductor layer is patterned into a series of mutually perpendicular lines (not shown). When a voltage is applied across the cell cavity 18 by addressing the appropriate line on each side of the cell, the liquid crystal molecules 26 reorient themselves to follow the applied electric field. The liquid crystal materials 26 are thus untwisted as shown in FIG. 1B. The passage of the untwisted light beam 34 is blocked by the exit polarizer 32 as long as the voltage is present. When the voltage is turned off(as shown in FIG. 1A), the liquid crystal molecules 26 returns to their original state and the cell or the pixel becomes clear again. As previously stated, typical voltages and currents required to activate the liquid crystal molecules are relatively low making it an ideal candidate for incorporation in battery-operated equipment where a low power consumption is essential. A typical twisted nematic (TN) liquid crystal cell used for small displays have a twist angle of 90°. More recently developed supertwisted nematic (STN) material forms a twist angle up to 270° and thus allow higher contrast and faster response time so that many pixel elements can be multiplexed in a single display.

While twisted nematic type liquid crystal display devices enjoy the traditional benefits of liquid crystal display cells such as lightweight and low power consumption, they also exhibit disadvantages such as the limitation of a narrow viewing angle on a flat panel device, and the unsymmetrical viewing angles at various viewing positions toward the panel. While others have proposed various techniques for correcting the narrow viewing angle drawback of the liquid crystal display device, none of the techniques proves to be satisfactory. For instance, one method is the utilization of a two-domain twisted nematic mode liquid crystal device for correcting the viewing angles of LCD devices. Even though the technique improves the viewing angle somewhat, the technique requires complex manufacturing process to be used. For instance, two orientation steps must be performed on both the upper and the lower glass substrate such that the fabrication cost and time are significantly increased. Furthermore, the focusing error is increased between the domains on the upper and the lower substrate which increases light leakage and sacrifices the quality of the device produced.

It is therefore an object of the present invention to provide a method for fabricating a liquid crystal display cell that does not have the drawbacks and shortcomings of the conventional fabrication methods.

It is another object of the present invention to provide a method for fabricating a liquid crystal display cell that has improved viewing angle by the addition of only a limited number of processing steps.

It is a further object of the present invention to provide a method for fabricating a liquid crystal display cell by aligning liquid crystal molecules with a predetermined slope formed on a base substrate.

It is still another object of the present invention to provide a method for fabricating a liquid crystal display cell by incorporating steps for forming a multiplicity of elongated steps on the surface of a lower substrate first and then coating the steps with a layer of insulating material such that sloped sidewalls are formed on the steps.

It is another further object of the present invention to provide a method for fabricating a liquid crystal display cell that has improved viewing angle by first depositing a photosensitive layer on a lower substrate, then patterning the layer into a multiplicity of elongated steps and depositing an insulating material layer overlying the steps thus forming sloped sidewalls on the steps.

It is yet another object of the present invention to provide a method for fabricating a liquid crystal display cell which has improved viewing angle by aligning liquid crystal molecules at an angle between about 10° and about 60° when measured from a plane perpendicular to the planar surface of the base substrate.

SUMMARY OF THE INVENTION

In accordance with the present invention, a method for fabricating a liquid crystal display cell that has improved viewing angle can be provided by a novel processing step of aligning the liquid crystal molecules with sloped sidewalls on a multiplicity of elongated steps formed on a base substrate.

In a preferred embodiment, a method for fabricating a liquid crystal display cell that has improved viewing angle can be carried out by the operating steps of first providing a first light-transmittive substrate, then depositing a layer of a photosensitive material on top of the first light-transmittive substrate, then forming the layer of photosensitive material into a multiplicity of elongated steps, then depositing a layer of an insulating material overlying the elongated steps and thus forming sloped sidewalls on the steps, then positioning a second light-transmittive substrate juxtaposed to the first light transmittive substrate forming a liquid crystal display cell thereinbetween, and then filling the LCD cell with a liquid crystal material such that liquid crystal molecules are aligned to the sloped sidewalls on the multiplicity of elongated steps.

In another preferred embodiment, the present invention method for fabricating a liquid crystal display cell that has improved wide angle viewing capability can be carried out by the operating steps of first providing a first light-transmittive substrate, then depositing a layer of a photoresist material on top of the first light-transmittive substrate, then forming a pattern of a multiplicity of elongated steps in the layer of the photoresist material by a photolithography method, then blanket depositing a layer of an insulating material overlying the multiplicity of elongated steps such that sloped sidewalls having a predetermined slope are formed on the steps, then depositing a first conductive layer on the layer of the insulating material, then positioning a second light-transmittive substrate which has a second conductive layer deposited and a multiplicity of electronic switching devices built thereon juxtaposed to the first light-transmittive substrate forming a LCD cell thereinbetween, and then filling the LCD cell with a liquid crystal material such that liquid crystal molecules are aligned to the predetermined slope on the sloped sidewalls of the multiplicity of elongated steps.

The present invention is further directed to a liquid crystal display cell that has improved wide viewing angle capability which includes a first light-transmittive substrate, a multiplicity of elongated steps on the first substrate, a layer of an insulating material on top of the multiplicity of elongated steps and the first substrate which has sloped sidewalls formed on the elongated steps, a layer of a conductive material overlying the layer of insulating material, a second light-transmittive substrate juxtaposed to and spaced apart from the first light-transmittive substrate, the second light-transmittive substrate has a conductive layer and a multiplicity of electronic switching device formed thereon, and a liquid crystal material filling a cavity formed between the first and the second light-transmittive substrate with its molecules aligned to the sloped sidewalls on the elongated steps.

BRIEF DESCRIPTION OF THE DRAWINGS

Other objects, features, and advantages of the present invention will become apparent upon consideration of the specification and the appended drawings in which:

FIGS. 2A–2E are enlarged, cross-sectional view of the present invention liquid crystal display cell illustrating various steps of fabrication.

FIG. 3 is an illustration showing an enlarged, cross-sectional view of the present invention liquid crystal display cell after the completion of the fabrication process.

DETAILED DESCRIPTION OF THE PREFERRED EMBODIMENT

In accordance with the present invention, a method for fabricating a liquid crystal display cell that has improved viewing angle is provided during which a multiplicity of elongated steps are first formed on a base substrate, an insulating material layer is then deposited on top of the elongated steps such that sloped sidewalls are formed on the steps to align liquid crystal molecules subsequently filled to the same slope.

Figure 1A:
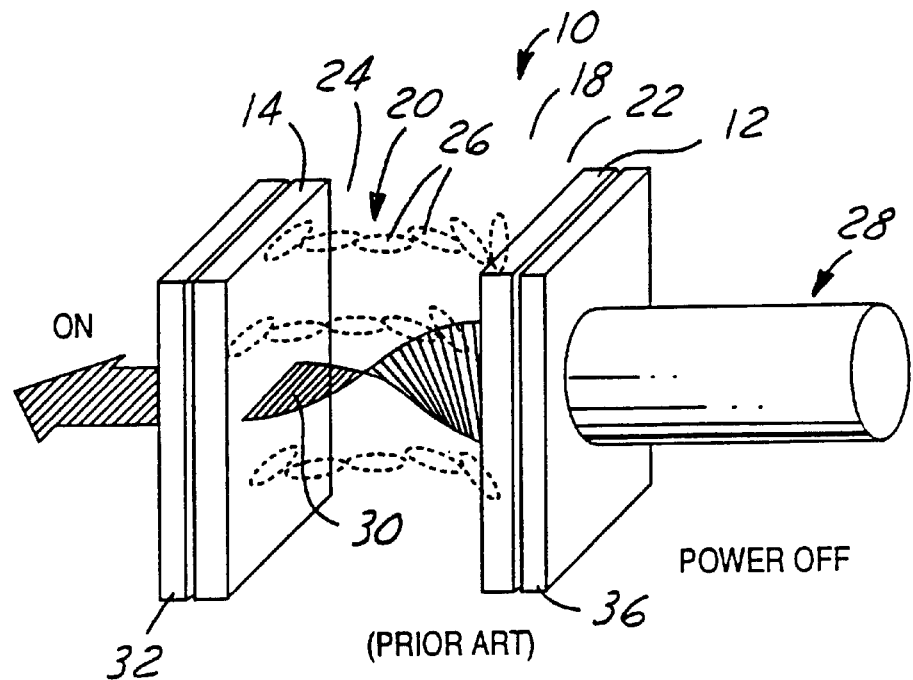
FIGS. 1A and 1B are graphical illustrations of a conventional twisted nematic liquid crystal display cell when a voltage is turned off or turned on, respectively.
Figure 1B:
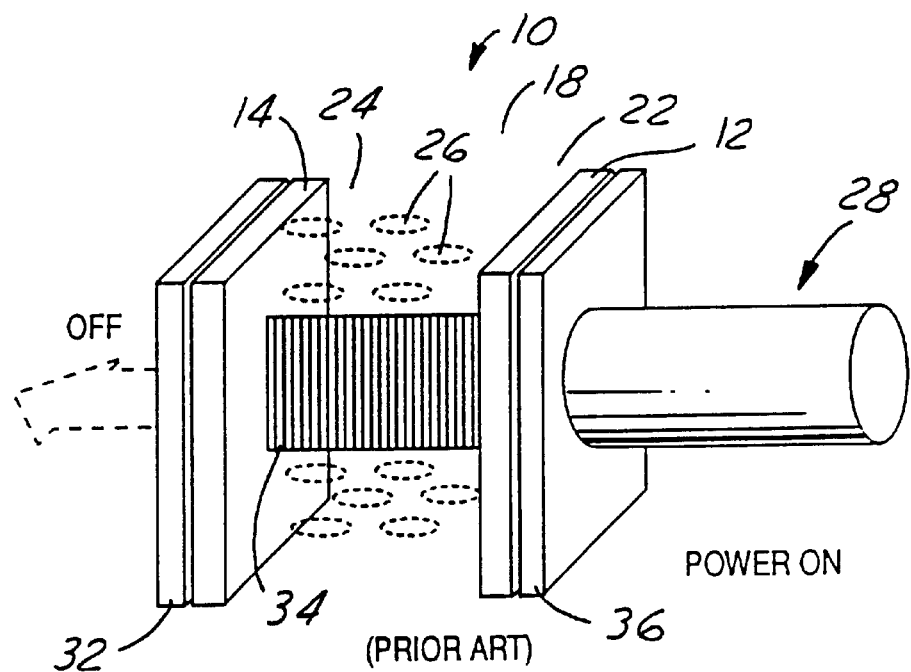

Referring now to FIGS. 2A–2E wherein a present invention process flow for fabricating a liquid crystal display cell is shown. A light-transmittive substrate 40 is first provided. The light-transmittive substrate is generally of a ceramic nature and can be supplied in various materials such as glass and quartz. This is also shown in FIG. 1A as substrate 14. Onto the light-transmittive substrate 40 is then coated a layer of a photosensitive material 42. A suitable photosensitive material 42 is a photoresist material preferably of a negative resist nature. Photoresist materials are generally organic compounds which change solubility after exposure to ultraviolet light. The regions in the resist that are exposed to light become either more soluble or less soluble when exposed to a solvent in a subsequent developing process. When a positive resist material is coated on the surface of a substrate and exposed to ultraviolet light, the exposed regions become more soluble and thus a positive image of the mask is defined in the resist layer. A negative resist, on the other hand, when exposed to a radiation of light, the irradiated regions become less soluble in the developer thus a negative image of the mask is printed in the resist layer. For the present invention application, a negative photoresist layer can be more suitably used. Generally, a negative photoresist layer is exposed and developed, the remaining photoresist film on the substrate must protect the substrate during subsequent processing steps such as etching or ion implantation. In the present invention novel method, a negative photoresist material is used in a novel and unique way in that the remaining photoresist layer on top of a substrate is used as elongated steps for building a multiplicity of steps on the surface of a substrate.

Negative photoresist materials generally consist of polymers which are chemically inert and photoactive agents. When a negative photoresist material is exposed to radiation, the molecules of the polymer are chemically linked, or cross-linked, to each other. The photoresist material, after exposure, therefore increases its molecular weight due to the cross-linking reaction and thus becoming less soluble when exposed to a developer. A typical negative photoresist material is a polyisoprene rubber and a photoactive agent. The photoactive agent releases a gas such as nitrogen when exposed to light and the radicals generated react with the double bond in the isoprene to form cross-links between the rubber molecules. The cross-linked rubber molecules thus become less soluble in an organic developer solvent. The photoactive agent used can be activated by the absorption of light energy in the 200~400 nm range by transferring energy to the rubber molecules and thus enhancing the cross-linking reaction. A negative resist material such as polyisoprene has a resolution limit of about 2 μm, even though it provides processing advantages such as good resistance to etching and superior adhesion to substrates.

In the present invention method, as shown in FIG. 2B, the negative resist material layer 42 coated can be of any suitable polymeric material as long as the thickness of the coating can be adequately controlled. A coating thickness, which determines the thickness of the steps formed subsequently, should be in the range between about 1 μm and about 4 μm, and preferably between about 2 μm and about 3 μm. The photoresist layer 42 is then patterned by a conventional photolithographic process in which a pattern of a multiplicity of elongated strips is reproduced on the surface of the photoresist layer. The photoresist layer 42 is then developed by washing away the non-cross-linked portions of the photoresist layer such that steps 46 of desirable dimensions are formed. It has been found that a suitable distance between the elongated steps 46 formed is between about 60 μm and about 100 μm, and preferably between about 70 μm and about 90 μm. The width of each step 46 formed can be in the range between about 10 μm and about 30 μm. This is shown in FIG. 2C.

In the next step of the present invention novel process, an insulating material layer 50 is blanket deposited on top of the substrate 40 and the elongated steps 46. The deposition method for the insulating material layer 50 can be suitably a spin-on type of coating process. The viscosity of the insulating material should be suitably controlled to enable good process control for producing a desirable thickness. A suitable insulating material used can be epoxy, acrylic, polyimide or any other suitable polymeric materials that can be conveniently coated by a spin-on process. In the preferred embodiment of the present invention, suitable acrylic materials such as that produced by Fuji-Hunt grade CT, or by JSR of a acrylic material are used. The material layer should provide an adequate insulating property such that a conductive layer can be deposited on top in a subsequent process. Polyimide is also an ideal candidate, even though at slightly higher cost. An important factor to be considered for the spin-on coating process is that the viscosity of the insulating material should be easily controllable such that the thickness of the coating can be suitably controlled. A substrate 40 that is coated by the insulating layer 50 is shown in FIG. 2B. The thickness of the insulating coating layer 50 should be in the range between about 1 μm and about 5 μm. This thickness range is suitable for a liquid crystal cell that has a total thickness between the two substrates of approximately between about 3 μm and about 10 μm. It should be noted that the slope 56 produced on the sidewalls of the elongated steps 46 is an important aspect of the present invention. As shown in FIG. 2D, the sloped sidewalls 56 make an angle θ with a plane that is perpendicular to the planar surface 52 of the substrate 40. A suitable angle θ should be in the range between about 10° and about 60°, preferably between about 30° and about 50°, and more preferably between about 40° and about 45°.

The sloped sidewalls 56 produced by the present invention novel method enables the liquid crystal molecules subsequently filled (as shown in FIG. 3) to align themselves along the sloped sidewalls. This processing, step further provides another benefit of the present invention process in that the control of the etched sidewalls 48 of the elongated steps 46 is not critical due to the fact that the sidewalls 48 are covered in the subsequent step by the insulating layer 50.

The present invention novel process therefore can tolerate small variations in the results of the developing process for the negative photoresist layer and the resulting sidewalls formed on the elongated steps. The developing process for the photoresist layer does not have a large effect on the present invention method and devices formed therefrom. The final insulating material coating 50 provides smooth and sloped sidewalls 56 which is suitable for aligning the liquid crystal molecules.

In the next step of the process, as shown in FIG. 2E, a conductive material layer 60 is coated on top of the insulating layer 50 by a blanket deposition process. It should be noted that the slope sidewalls 56 shown in FIG. 2D are similarly reproduced on the conductive layer 60 as shown in FIG. 2E. The conductive layer can be suitably deposited of any conductive material. A frequently used conductive material is ITO (indium-tin-oxide) which is substantially transparent and therefore a suitable candidate for liquid crystal display applications. The ITO material can be deposited from a powder to a thickness of between about 1,000 Å and about 4,000 Å. The ITO material provides the desirable properties of transparency, resistivity, and ease of patterning. A desirable light transmittance of 90% and a low resistivity of 1~3 μ-ohm-cm are normally obtainable in a ITO film. A higher deposition temperature such as 300° C. is desirable for the ITO sputtering process. It has been observed that the higher the deposition temperature, the lower the resistivity of the film obtained. The conductive layer 60 is used as an electrode for the substrate 40 in operating the liquid crystal cell, or pixel. A final, uppermost layer of insulating material such as polyimide (not shown) is then deposited on top of the conductive layer for insulation purpose.

FIG. 3 shows a completed liquid crystal cell 70 prepared by the present invention novel process. It is seen that an upper substrate 80, made of a similar material as that used in the lower substrate 40, i.e., of a light-transmittive nature, is used. For simplicity reasons, the various structures that are required on the upper substrate 80, such as a layer of conductive material for use as the electrode, a multiplicity of electronic switching devices or transistors, and layers of insulating materials for insulating purpose are not shown in FIG. 3. Those layers are easily prepared by conventional methods and are thus not described in the present application.

It is seen in FIG. 3 after an upper substrate 80 is positioned juxtaposed in a spaced apart relationship with the lower substrate 40, a suitable liquid crystal material 90 is used to fill the cavity 82 formed between the upper substrate 80 and the lower substrate 40. The liquid crystal molecules 92, generally in a colloidal condition and formed in columnar-shape are aligned at the same angle of the sloped sidewalls 56 previously formed. The liquid crystal molecules 96 that are not situated immediately adjacent to the sloped sidewalls 56 of the insulating layer 50 are not oriented in a sloped fashion as the molecules 92. Liquid crystal molecules 96 remain substantially in a parallel position with the surfaces of the substrate 40 and 80. The sloped liquid crystal molecules 92 reproduced from the sloped sidewalls 56 of the insulating layer 50 thus produce the desirable result of the present invention novel method of providing an improved, wider viewing angle of a LCD device so produced. The present invention novel method therefore has been amply demonstrated in the above descriptions and by the FIGS. 2A~2E and 3.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will readily apply these teachings to other possible variations of the inventions.

The embodiments of the invention in which an exclusive property or privilege is claimed are defined as follows:

We claim:

1. A method for fabricating a liquid crystal display (LCD) cell comprising the steps of:

providing a first light-transmittive substrate, depositing a layer of a photosensitive material on a top surface of said first light-transmittive substrate, forming the layer of photosensitive material into elongated steps, depositing a layer of an insulating material overlying the steps and forming sloped sidewalls on the steps, said sloped sidewalls have an angle measured from a plane perpendicular to a planar surface of the first substrate between about 10° and about 60°, positioning a second light-transmittive substrate juxtaposed to the first light-transmittive substrate forming a LCD cell thereinbetween, and filling said LCD cell with a liquid crystal material such that liquid crystal molecules are aligned to the sloped sidewalls on the steps.

2. A method according to claim 1, wherein said forming step for the layer of photosensitive material comprises a photolithography method.

3. A method according to claim 1, wherein said first and said second light-transmittive substrate are formed of a silicate material.

4. A method according to claim 1, wherein said first and said second light-transmittive substrate are formed of glass or quartz.

5. A method according to claim 1 further comprising the step of coating said insulating material with a layer of conductive coating.

6. A method according to claim 5, wherein said conductive coating layer is formed of indium-tin-oxide (ITO).

7. A method according to claim 1, wherein said layer of insulating material is deposited by a spin coating method.

8. A method according to claim 1, wherein said elongated steps formed each having a width between about 10 $\mu$m and about 30 $\mu$m.

9. A method according to claim 1, wherein said elongated steps formed are spaced apart from each other at a distance between about 60 $\mu$m and about 100 $\mu$m.

10. A method according to claim 1, wherein said layer of insulating material deposited over said elongated steps has a thickness between about 1 $\mu$m and about 4 $\mu$m.

11. A method according to claim 1, wherein said layer of insulating material deposited is selected from the group consisting of epoxy, acrylic and polyimide.

12. A liquid crystal display (LCD) cell having improved wide-viewing-angle capability comprising:

a first light-transmittive substrate, a multiplicity of elongated steps on said first substrate, a layer of an insulating material overlying said multiplicity of elongated steps and said first substrate having sloped sidewalls formed on said elongated steps, said sloped sidewalls have an angle measured from a plane perpendicular to a planar surface of the first substrate between about 10° and about 60° a layer of a conductive material overlying said layer of insulating material, a second light-transmittive substrate juxtaposed to and spaced apart from said first light-transmittive substrate, a liquid crystal material filing a cavity formed between said first and said second light-transmittive substrate having its molecules aligned to the sloped sidewalls on said elongated steps on said first substrate.

13. A LCD cell according to claim 12, wherein said first and said second light-transmittive substrate are formed of a silicate material.

14. A LCD cell according to claim 12, wherein said insulating material overlying said multiplicity of elongated steps is deposited by a spin-on coating process with a material selected from the group consisting of epoxy, acrylic and polyimide.

15. A LCD cell according to claim 12, wherein said multiplicity of elongated steps on said first light-transmittive substrate are formed of a photosensitive material.

16. A LCD cell according to claim 12, wherein said conductive layers on said first light-transmittive substrate is formed of indium-tin-oxide (ITO).

17. A LCD cell according to claim 12, wherein said multiplicity of elongated steps each having a width between about 10 $\mu$m and about 30 $\mu$m, and are spaced apart from each other at a distance between about 60 $\mu$m and about 100 $\mu$m.

18. A LCD cell according to claim 12, wherein said layer of insulating material on top of said multiplicity of elongated steps and said first substrate has a thickness between about 1 $\mu$m and about 4 $\mu$m.

19. A method for fabricating a liquid crystal display (LCD) cell having improved wide-angle-viewing capability comprising the steps of:

providing a first light-transmittive substrate, depositing a layer of a photoresist material on a top surface of said first light-transmittive substrate, forming a pattern of a multiplicity of elongated steps in said layer of photoresist material by a photolithography method, blanket depositing a layer of an insulating material overlying said multiplicity of elongated steps such that sloped sidewalls having a predetermined slope are formed on said steps, said predetermined slope on said sloped sidewalls of said elongated steps is between about 10° and about 60° when measured from a plane perpendicular to a planar surface of said first light-transmittive substrate, depositing a first conductive layer on said layer of insulating material, positioning a second light-transmittive substrate juxtaposed to and spaced apart from said first light-transmittive substrate forming a LCD cell thereinbetween, and filling said LCD cell with a liquid crystal material such that liquid crystal molecules are aligned to the predetermined slope on said sloped sidewalls of said elongated steps.

20. A method according to claim 19, wherein said predetermined slope is preferably between about 30° and about 50°, and more preferably between about 40° and about 45°.

* * * * *